(12) United States Patent
Holmberg

(10) Patent No.: US 6,247,141 B1
(45) Date of Patent: Jun. 12, 2001

(54) PROTOCOL FOR PROVIDING REPLICATED SERVERS IN A CLIENT-SERVER SYSTEM

(75) Inventor: Per Anders Holmberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/159,771

(22) Filed: Sep. 24, 1998

(51) Int. Cl.$^7$ .............................. G06F 11/14; H04L 29/02

(52) U.S. Cl. .................... 714/2; 714/4; 707/1; 709/203

(58) Field of Search ................................ 714/2, 4, 43, 56, 714/15, 20, 3, 48, 758, 807; 707/1, 10, 204; 709/203, 217, 212, 227, 101, 228, 219, 216; 711/162; 370/216

(56) References Cited

U.S. PATENT DOCUMENTS

| | | |
|---|---|---|
| 4,879,716 | 11/1989 | McNally et al. . |
| 5,005,122 * | 4/1991 | Griffin et al. . |
| 5,307,481 | 4/1994 | Shimazaki et al. . |
| 5,434,994 | 7/1995 | Shaheen et al. . |
| 5,452,448 | 9/1995 | Sakuraba et al. . |
| 5,455,932 | 10/1995 | Major et al. . |
| 5,488,716 | 1/1996 | Schneider et al. . |
| 5,513,314 | 4/1996 | Kandasamy et al. . |
| 5,526,492 | 6/1996 | Ishida . |
| 5,566,297 | 10/1996 | Devarakonda et al. . |
| 5,581,753 | 12/1996 | Terry et al. . |
| 5,634,052 * | 5/1997 | Morris . |
| 5,652,908 * | 7/1997 | Douglas et al. . |
| 5,673,381 | 9/1997 | Huai et al. . |
| 5,696,895 | 12/1997 | Hemphill et al. . |
| 5,751,997 | 5/1998 | Kullick et al. . |
| 5,796,934 | 8/1998 | Bhanot et al. . |

FOREIGN PATENT DOCUMENTS

0838758A2    4/1998   (EP) .

OTHER PUBLICATIONS

Murthy Devarakonda, et al., "Server Recovery Using Naturally Replicated State: A Case Study," IBM Thomas J. Watson Research Center, Yorktown Hts, NY, IEEE Conference on Distributed Computing Systems, pp. 213–220, May 1995.

Kenneth P. Birman, "The Process Group Approach to Reliable Distributed Computing", *Reliable Distributed Computing with the Isis Toolkit*, pp. 27–57, ISBN 0–8186–5342–6), reprinted from *Communications of the ACM*, Dec. 1993.

Robbert Van Renesse, "Causal Controversy at Le Mont St.–Michel", *Reliable Distributed Computing with the Isis Toolkit*, pp. 58–67, (ISBN 0–8186–5342–6), reprinted from *ACM Operating Systems Review*, Apr. 1993.

(List continued on next page.)

*Primary Examiner*—Gopal C. Ray
(74) *Attorney, Agent, or Firm*—Burns, Doane, Swecker & Mathis, L.L.P.

(57) ABSTRACT

A fault-tolerant client-server system has a primary server, a backup server; and a client. The client sends a request to the primary server, which receives and processes the request, including sending the response to the client, independent of any backup processing. The response includes the primary server state information. The primary server also performs backup processing that includes periodically sending the primary server state information to the backup server. The client receives the response from the primary server, and sends the primary server state information to the backup server. The primary server state information includes all request-reply pairs that the primary server has handled since a most recent transmission of primary server state information from the primary server to the backup server. The primary server's backup processing may be activated periodically based on a predetermined time interval. Alternatively, it may be activated when the primary server's memory for storing the primary server state information is filled to a predetermined amount.

10 Claims, 4 Drawing Sheets

OTHER PUBLICATIONS

Kenneth P. Birman, "Virtual Synchrony Model", *Reliable Distributed Computing with the Isis Toolkit*, pp. 101–106, (ISBN 0–8186–5342–6) 1994.

Carlos Almeida, et al. "High Availability in a Real–Time System", *Reliable Distributed Computing with the Isis Toolkit*, pp. 167–172, (ISBN 0–8186–5342–6), reprinted from *ACM Operating Systems Review*, Apr. 1993 and *Proceedings of the 5th ACM SIGOPS Workshop*, Sep. 1992.

Kenneth P. Birman, et al., "Reliable Communication in the Presence of Failures", *Reliable distributed Computing with the Isis Toolkit*, pp. 176–200, (ISBN 0–8186–5342–6), reprinted from *ACM Transaction on Computer Systems*, Feb. 1987.

Kenneth P. Birman, et al., "Lightweight Causal and Atomic Group Multicast", *Reliable Distributed Computing with the Isis Toolkit*, pp. 201.236, (ISBN 0–8186–5342–6), reprinted from *ACM Transactions on Computer Systems*, Aug. 1991.

Frank Schmuck, "Efficient Broadcast Primitives in Asynchronous Distributed Systems", *Reliable Distributed Computing with the Isis Toolkit*, pp. 263–283, (ISBN 0–8186–5342–6) 1994.

Timothy A. Clark, et al., "Using th Isis Resource Manager for Distributed, Fault–Tolerant Computing", *Reliable Distributed Computing with the Isis Toolkit*, pp. 300–308, (ISBN 0–8186–5342–6), reprinted from *Proceedings of the Twenty–Sixth Annual Hawaii International Conference on Systems Science*, 1993.

Dan Strassberg, "When Computers Must Not Fail . . . ", EDN, Aug. 17, 1995, pp. 42–50.

Inhwan Lee, et al., "Software Dependability in the Tandem Guardian System", IEEE Transactions on Software Engineering, vol. 21, No. 5, May 1995, pp. 455–467.

* cited by examiner

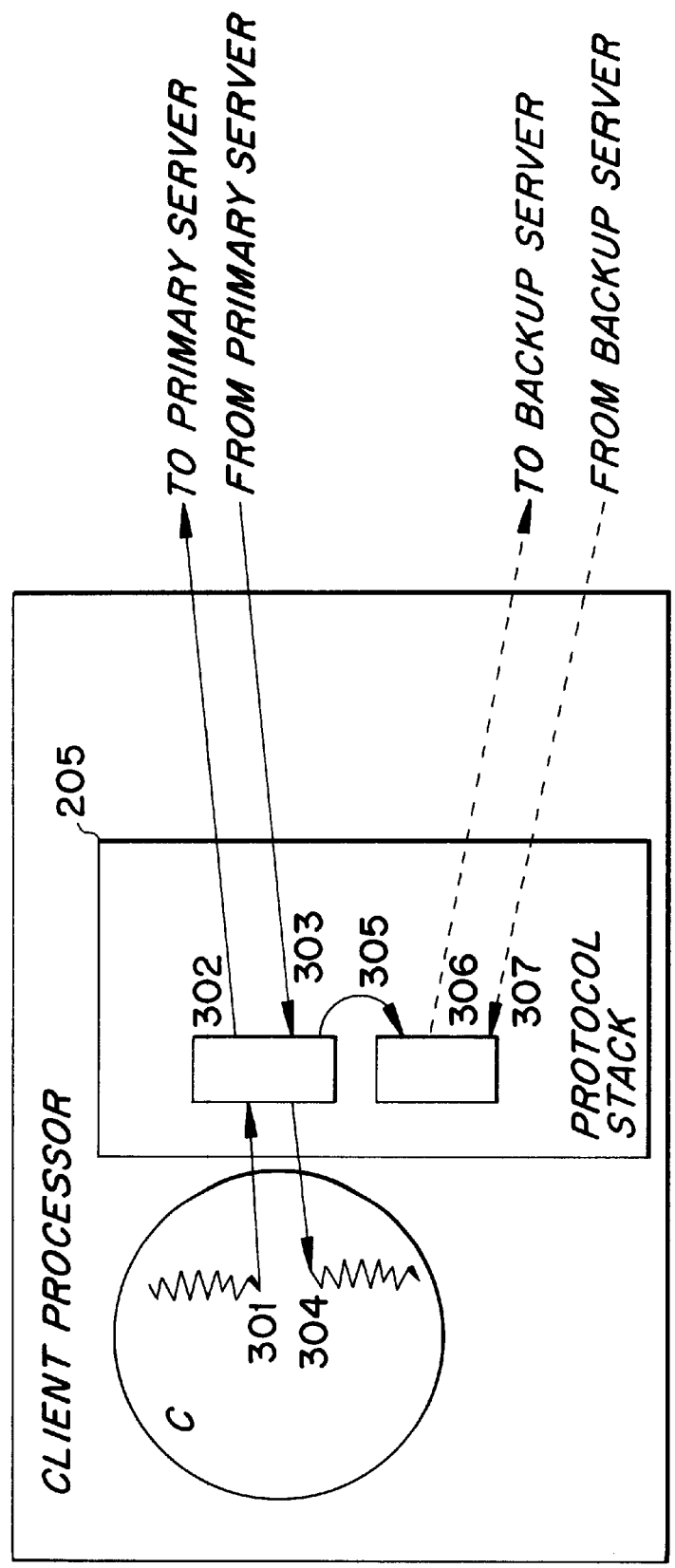

PROTOCOL FOR PROVIDING REPLICATED SERVERS IN A CLIENT-SERVER SYSTEM

BACKGROUND

The invention relates to fault tolerant server systems, and more particularly to fault tolerant server systems including redundant servers.

High availability of service in a telecommunication system can be achieved by means of fault tolerant computers or distributed system architectures. The use of this redundancy, however, may adversely affect other system properties. For example, the utilization of redundancy on the hardware level increases cost, physical volume, power dissipation, fault rate, and the like. This makes it impossible to use multiple levels of redundancy within a system.

For example, distributed systems can incorporate replication between computers, in order to increase robustness. If each of these computers are fault tolerant, costs will multiply. Furthermore, if backup copies are kept in software, for the purpose of being able to recover from software faults, the cost of the extra memory will multiply with the cost of the fault tolerant hardware, and for the multiple copies in the distributed system. Thus, in order to keep costs low, it is advisable to avoid the use of multiple levels of redundancy. Since the consequence of such a design choice is that only one level of redundancy will be utilized, it should be selected so as to cover as many faults and other disturbances as possible.

Disturbances can be caused by hardware faults or software faults. Hardware faults may be characterized as either permanent or temporary. In each case, such faults may be covered by fault-tolerant computers. Given the rapid development of computer hardware, the total number of integrated circuits and/or devices in a system will continue to decrease, and each such integrated circuit and device will continue to improve in reliability. In total, hardware faults are not a dominating cause for system disturbances today, and will be even less so in the future. Consequently, it will be increasingly more difficult to justify having a separate redundancy, namely fault tolerant computers, just to handle potential hardware faults.

The same is not true with respect to software faults. The complexity of software continues to increase, and the requirement for shorter development time prevents this increasingly more complex software from being tested in all possible configurations, operation modes, and the like. Better test methods can be expected to fully debug normal cases. For faults that occur only in very special occasions, the so-called "Heisenbuggs", there is no expectation that it will be either possible or economical to perform a full test. Instead, these kinds of faults need to be covered by redundancy within the system.

A loosely coupled replication of processes can cover almost all hardware and software faults, including the temporary faults. As one example, it was reported in I. Lee and R. K. Iyer, "Software Dependability in the Tandem Guardian System," IEEE TRANSACTIONS ON SOFTWARE ENGINEERING, vol. 21, No. 5, May 1995 that checkpointing (i.e., the copying of a present state to a stand-by computer) and restarting (i.e., starting up execution from a last checkpointed state by, for example, reading a log of the transactions that have occurred since the last checkpoint and then starting to process new ones) covers somewhere between 75% and 96% of the software faults, even though the checkpointing scheme was designed into the system to cover hardware faults. The explanation given in the cited report is that software faults that are not identified during test are subtle and are triggered by very specific conditions. These conditions (e.g., memory state, timing, race conditions, etc.) did not reoccur in the backup process after it took over; consequently, the software fault does not reoccur.

A problem with replication in a network is that there are a few services, such as arbitration of central resources, that do not lend themselves to distribution. This type of service must be implemented in one process and needs, for performance reasons, to keep its data on its stack and heap. To achieve redundancy, this type of process must then be replicated within the distributed network. In a high performance telecommunication control system this replication must be done with very low overhead and without introducing any extra delays.

SUMMARY

It is therefore an object of the present invention to provide methods and apparatuses for implementing a fault-tolerant client-server system.

In accordance with one aspect of the present invention, the foregoing and other objects are achieved in a fault-tolerant client-server system that comprises a primary server, a backup server and a client. The client sends a request to the primary server. The primary server receives and processes the request, including sending a response to the client, independent of any backup processing being performed by the primary server, wherein the response includes primary server state information. By sending the response independent of backup processing, a higher level of concurrence is achieved, thereby making the system more efficient. The primary server also performs backup processing, including periodically sending the primary server state information to the backup server. The client receives the response from the primary server, and sends the primary server state information from the client to the backup processor.

In another aspect of the invention, the primary server state information includes all request-reply pairs that the primary server has handled since a most recent transmission of primary server state information from the primary server to the backup server.

In yet another aspect of the invention, the primary server stores the primary server state information in storage means. The act of performing backup processing in the primary server may be performed in response to the storage means being filled to a predetermined amount.

In an alternative embodiment, the act of performing backup processing in the primary server may be performed periodically based on a predetermined time interval.

BRIEF DESCRIPTION OF THE DRAWINGS

The objects and advantages of the invention will be understood by reading the following detailed description in conjunction with the drawings in which:

FIG. 3 is a diagram illustrating the flow of messages between a client, a primary server and a backup server in accordance with one aspect of the invention.

DETAILED DESCRIPTION

Figure 1:
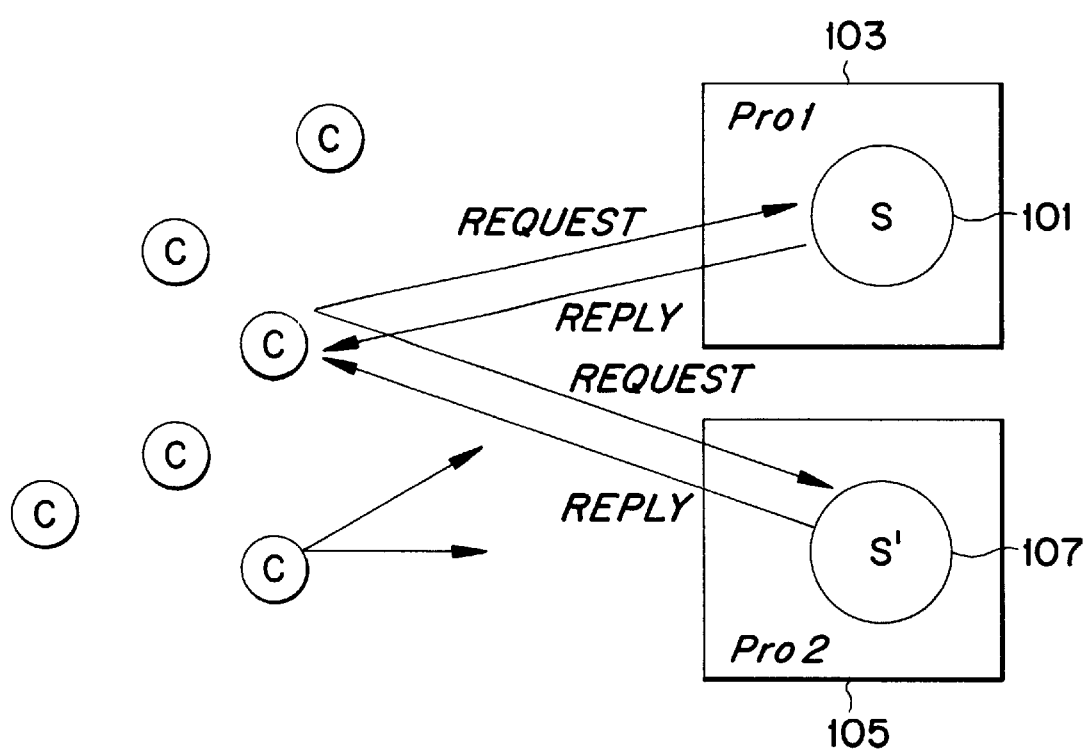
FIG. 1 is a block diagram that illustrates the use of redundant servers in a client-server application.

The various features of the invention will now be described with respect to the figures, in which like parts are identified with the same reference characters.

FIG. 1 is a block diagram that illustrates the use of redundant servers in a client-server application. In particular, a plurality of client applications, C, are shown. A primary server, S 101, runs on a first processor 103. A second processor 105, which is separate from the first processor 103, runs a backup server, S' 107, in parallel with the primary server S 101. Overall, so that when one fails, the other can take over without any client application C noticing the problem, the primary server S 101 and the backup server S' 107 should have the same internal state at a virtual time, T, that occurs after processing any specific request from the client application C. (Since the backup server S' 107 trails the primary server S 101, the backup server S' 107 reaches the virtual time later in real time than the primary server S 101 does.) The existence of replicated server processes should not be visible to the client applications C using the server. In order to implement such a strategy, the following problems need to be solved:

Addressing: The client application C should address the server in a consistent way, regardless of whether the service is being performed by the primary server S 101 or the backup server S' 107 (or both).

Replication and Incoming requests from different client applications C, as well

Synchronization: as fault and repair notifications, can arrive in different order to primary server S 101 and backup server S' 107 due to differences in the physical network between processors. However, these requests must be sorted in the same order.

Fault and Repair Server process failure and the start of a new server process

Notifications: must be detected by the server that is still working.

State Transfer: When a server process restarts after a failure, the working server must transfer its internal state to the new server before it can start processing requests.

In addressing the above problems, a preferred embodiment of the invention attempts to satisfy the following goals:

Solve the replication problem only once. The implementation of replication has many pitfalls and is complicated to verify. There are many possible faults that must be covered.

Add only a low overhead, and impose this only on communications to replicated processes.

Worst case response times during normal operation, in the case of failure, and also when reintegrating a new process should all be known in advance and kept to acceptable levels.

No extra messages should be added to critical timing paths. Many conventional implementation techniques violate this goal. For example, a primary server may have to send a message to the secondary server and get a reply back before sending a reply back to the client. It is desired to avoid this so that the system's real-time response times are not slowed down by the added redundancy.

Handle many clients and dynamic clients. Telecommunication applications typically have many possible clients for a server. This means that one cannot use algorithms that, for example, must update information in the clients when the server process fails or recovers. Also, client processes typically have short lifetimes (they may exist only during a call). This means that algorithms that require the server to keep track of clients cannot be used.

In order to make the protocol simpler, a preferred embodiment of the invention imposes several restrictions. Some of these restrictions can easily be lifted by making the protocol more general. However, their inclusion here facilitates a description of the underlying mechanisms involved. These restrictions are:

Only two servers are involved: a primary and a backup. It will be apparent to those of ordinary skill in the art that the protocol can be extended to include more.

Tolerance for one fault at a time, that is, a single client or server failure. The system must recover (for example by starting up a cold stand-by) before another fault can be tolerated.

Simple network configurations. Complicated network fault cases that, for example, split the network in two, with one of the server pairs in each, are not considered.

No large messages. Bulk data transfers and the like will probably overflow buffers or queues.

Soft real-time responses. In the normal case (i.e., without any malfunctioning server) it is possible to guarantee approximately the same response times as for systems utilizing non-replicated servers. However, longer response times must be accepted at the time of failure, recovery and reintegration. These longer response times can still be guaranteed not to exceed a predetermined maximum amount of time.

Deterministic operation of servers. As will be described in greater detail below, the backup server will receive periodic update messages from the primary server. The processing of these update messages in the backup server must be deterministic in order to guarantee that it will reach the same internal state as that of the primary when sending the update message. The server software cannot include non-deterministic system calls, such as calls to a time-of-day clock (which returns a different result, depending on when it is called), because such calls would cause the backup server to reach an internal state that differs from that of the primary server.

Thus, the state of the backup server must be 100% specified by the information that it receives from the primary server. This can be achieved in either of two ways:

a) the requests supplied to the primary server are also transferred to the backup server, which then reaches the same state as the primary server by doing identical processing of the request; or b) the results of processing (i.e., the reply to the client that generated by the primary server, as well as the changes in the server's internal state) are sent to the backup server.

Simple applications only. In the description of the inventive protocol set forth below, the replicated server cannot request services from other servers. The protocol would have to be extended in order to handle such a case. In one such extension, the second server would then detect that a request comes from a replicated server and follow the same (or similar) protocol.

Earlier, four problems that need to be solved were mentioned. An inventive solution to one of these, namely replication and synchronization, will now be described. In a preferred embodiment, replication and synchronization are implemented as part of the communication protocol that is used between the client and the server. Advantages of this approach are:

The implementation is done only once, when the protocol is designed.

The replication is hidden from the application. The protocol handles addressing of the replicated servers.

The inventive protocol is designed for efficient implementation of the desired replication and synchronization:

1) Two alternative implementations are possible:
   a) The implementation may be an extension to the communication method. This means that there would be no extra system calls for processing a request from a client in the primary server.
   b) As an alternative, the protocol may be integrated into the protocol stack. This makes it possible to make more efficient implementations.

So-called "middleware" solutions, in which fault tolerance is implemented by a layer of software on top of an existing operating system, would benefit from the first alternative (i.e., alternative "a") but not from the second (i.e., alternative "b").

2) The replication between servers can be outside the real-time critical loop. The client can get a reply as fast as the primary server S 101 can respond.

3) The extra information needed for keeping redundancy is attached to the reply in order to minimize overhead.

4) Updates/Heartbeats to the backup server S' 107 are done periodically in order to minimize overhead and to make it possible to guarantee that the recovery time after a fault will not exceed a predefined maximum. The number of requests that can be processed by the primary server but not by the backup server will be limited to the number of requests that can arrive between two periodic updates.

5) The replication can be supported within an I/O processor giving no overhead at all on the main processor.

The protocol guarantees that processed requests as well as information about the order in which the requests are processed, are always kept in two independent places in two separate computers. This strategy is based on two observations:

1) Redundant copies of the primary server state may be established at a later time than is conventionally performed, while still maintaining fault tolerance. That is, in conventional systems, server state information is transferred from the primary server to the backup server prior to sending a reply to the client. However, the invention recognizes that this is a conservative approach, because prior to sending a reply to the client, no other processor has seen the result. Consequently, a primary server crash would be considered to have occurred before the processing of the request. This is the case up to the time when the client receives the reply. This, then, is the latest possible time for establishing the existence of a redundant copy of the server state in order to have fault tolerance.

2) There are three independent parties involved: the client application C requesting a service, the primary server S 101, and the backup server S' 107. At any time it is sufficient that critical information be maintained in two redundant copies. However, these copies need not be maintained only by the primary server S 101 and the backup server S' 107 (as in a conventional two-phase commit protocol). Rather, the client can also be used for (temporarily) holding information.

Figure 2:
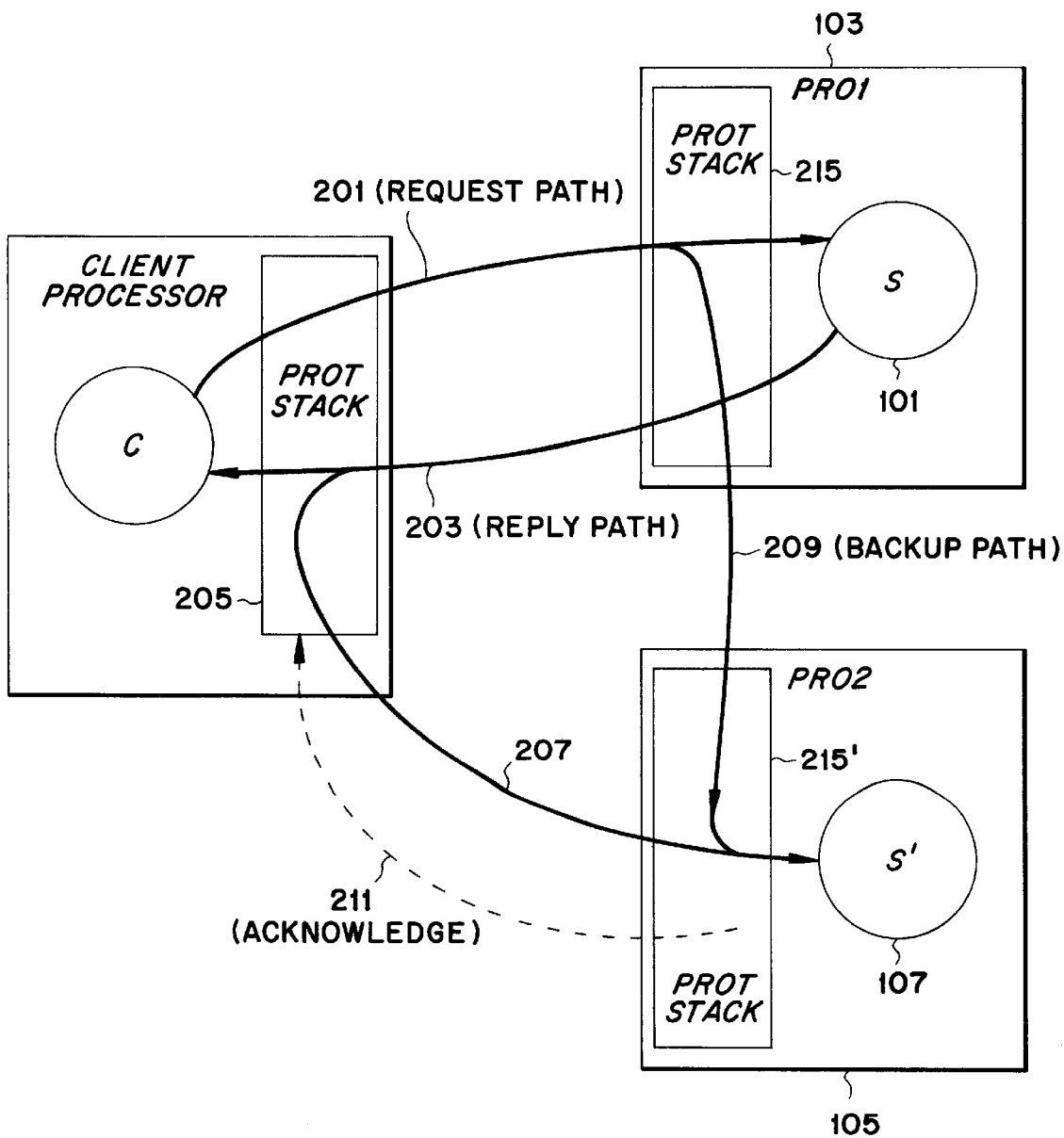
FIG. 2 is a diagram illustrating the message flow in a fault-tolerant client-server application.

For a simple server application, the replication is based on a message flow as illustrated in FIG. 2. A client application, C, accesses a primary server 101 via a protocol stack 205 running in the client processor. Counterpart protocol stacks 215, 215' also run in the primary and backup server processors, PRO1 and PRO2. Requests 201 are sent from the client application C to the primary server S 101. The protocol stack 215 of the primary server S 101 attaches a sequence number to the request and then processes the request. As a result of processing the request, the primary server S 101 generates and sends a reply message 203, via the protocol stack 215, to the client application C immediately. In accordance with one aspect of the invention, the server's protocol stack 215 performs the additional function of storing the incoming request 201 in a queue whose contents are periodically communicated, via backup path 209, to the protocol stack 215' of the backup server S' 107. In accordance with another aspect of the invention, the reply message 203 to the client C also includes information indicating at what point in a sequence of incoming requests (since the last flush) the client's request 201 was processed (i.e., the sequence number).

When the client application's protocol stack 205 receives the reply message 203, it does two things: 1) it passes the reply message 203 to the client application C, and 2) it sends a message 207 that may contain, for example, the original request as well as the reply to backup server's protocol stack 215', which passes it to the backup server S' 107. In some embodiments, the backup server's protocol stack 215' may send an acknowledge message 211 to the client's protocol stack 205, thereby confirming receipt of the client's message.

In addition to the backup server's receiving information from the client application's protocol stack 205, whenever the queue in the primary server's protocol stack 215 reaches a predetermined value, or alternatively when a predetermined amount of time has elapsed, the queue in the primary server's protocol stack 215 is flushed to the backup server S' 107 via backup path 209. In addition to supplying the vital redundant information to the backup server S' 107, the act of flushing also serves as a heartbeat, indicating to the backup S' 107 that the primary server S 101 is still alive. The time between flushes/heartbeats sets the maximum time for recovery when there is a fault.

The backup server S' 107 takes over execution when it fails to receive one or more heartbeats from the primary server S 101 and starts receiving requests from clients C.

The information that should be passed on to the backup server in order to guarantee that recovery is possible is: a) the original request, and b) the sequence number that was appended in the reply message. With this information, the back-up will (after a crash) be able to sort the requests to be in the same order in which they were processed by the primary server and then perform identical processing. The same information may be passed to the backup server S' 107 from both the client application's protocol stack 205 and the primary server's protocol stack 215, although in the case of information coming from the primary server's protocol stack 215, the sequence number is of less importance because the copy of the incoming requests may typically be passed on in the order in which they were processed.

Passing the entire primary server reply message (including the sequence number) to the backup makes it possible for the backup server to improve fault detection. In addition to using the sequence number for sorting out message order, the backup server S' 107 can then also verify that it is in synchronization with the primary server by comparing its own reply to the one from the primary server S 101. It should be noted, however, that it is sufficient to pass on a substitute for this information, such as a checksum of the reply, for this purpose as well.

For the fault detection purpose, the full reply information can be passed on from either source (i.e., via the client C or via periodic updates from the primary server S 101) or from both. In one embodiment, the full reply information is passed only via the periodic updates from the primary server's protocol stack 215 in order to minimize the amount of information that has to go the longer path via the client's protocol stack 205.

There are also several alternatives to appending the sequence information to reply messages in the text. One alternative is to just append the sequence number the request was processed in. Another alternative is to include the entire request sequence since the last periodic update. These alternatives serve the same purpose, and each can be regarded as "server state information" because they each define the order of the actions that the backup server S' 107 must take in order to achieve an identical state as that of the primary server S 101.

A number of fault cases, and how the invention handles them, will now be described:

Primary Server Crash Before Reply is Sent

In this case, the client C will not receive an acknowledge (i.e., reply message 203) from the primary server S 101. In response, the protocol stack 205 of the client C re-transmits the original request 201 to both the primary and secondary servers S 101, S' 107. Otherwise (i.e., in non-fault cases), the client application C sends the requests only to the primary server S 101. (It should be noted that the client application is generally unaware of this fault tolerance-related activity, since it addresses only the single logical server. Address translation and communication to the two servers, S 101 and S' 107, are handled by the protocol stack 205 within the client processor.) If the secondary server S' 107 misses the heartbeats from the primary server S 101, it takes over. Otherwise, it simply discards the request received from the client C.

Primary Server Crash after Sending a Reply but before Information is Flushed to Backup The information needed for updating the backup server S' 107 to the state that existed when the last reply was sent can be retrieved from update messages supplied by the client's protocol stack 205. Messages in the "reply path" from the primary server S 101 to the client C contain both the reply to the client application as well as the update information to the backup server S' 107. The client application need receive only the reply information from the client C, not the additional update information. As shown in FIG. 2, the update information is forwarded from the client's protocol stack 205 to the backup server S' 107 (via the backup server's protocol stack 215'). This update information is the same information that the backup server S' 107 otherwise receives by means of the periodic updates that are directly communicated by the primary server S 101. The cost of adding some extra information in an already existing message is small compared to having to send an extra message for it.

Client Crash after Sending Initial Request

In this case, the backup server S' 107 receives information for updating itself when the primary server flushes its queue.

Primary System Crash

The primary server S 101 as well as any clients executing in the same processor 103 will be lost. The backup server S' 107 executes remaining commands from the last flushed queue and then gets updated up to the point given by the last reply to a client that is executing outside of the primary server's processor 103.

Message Loss

Messages that do not get an immediate acknowledgment are re-transmitted once or twice before the receiving process (or processor) is considered to be faulty.

The client's protocol stack 205 will now be described in greater detail with reference to FIG. 3. At step 301, client application execution causes a request to be sent to the primary server. At step 302, the request is processed in the protocol stack 205 and sent to the primary server. The protocol implements re-transmission at message loss and a copy of the message is kept for doing this. At step 303, a reply has returned from the primary server. The reply is sent back to the client application processes without delay. A copy of the request and the associated reply are kept for the replication protocol. Because, in this example, the primary server is presumed to respond relatively quickly, there is no separate acknowledgment sent from the primary server to the client. That is, the reply that is returned from the primary server is sufficient to function as a reply. In other embodiments that include a relatively slow primary server, it may be necessary for the protocol to include a separate acknowledgment that would be sent from the primary server to the client prior to transmission of the reply.

At step 304, the application process can resume execution without waiting for the replication to be performed. At step 305, the protocol stack 205 stores the request as well as the reply in a queue that is designated for requests that are not yet replicated to the backup server.

At step 306, the client sends a message containing the original request as well as the reply to the backup server. In response, the backup server returns an acknowledgment (step 307) to the client, in order to confirm safe receipt of the client's message. It will be noted that without the acknowledgment, the client would have no other way of knowing that its message had been received because no other reply is expected from the backup server.

Earlier, several other problems were mentioned, namely Fault and Repair Notifications and State Transfer. The inventive solutions to these problems will now be described.

With respect to Fault and Repair Notification, the communication between the primary and secondary server also functions as a heartbeat. If the secondary server does not get updated regularly, it waits long enough to receive any outstanding client timeouts and then takes over. When a server process restarts, it checks whether there is an active primary server.

Regarding State Transfer, this is used at the time of restarting a failed server. The state of the executing server must then be copied to the restarted one before they, again, can work as a primary/backup pair. There is no fundamental difference between this state transfer and the type of state transfer needed when doing system software and hardware upgrades. Also, given the low number of hardware failures in modern processors, the state transfer mechanisms should be optimized for system upgrades.

Figure 4A:
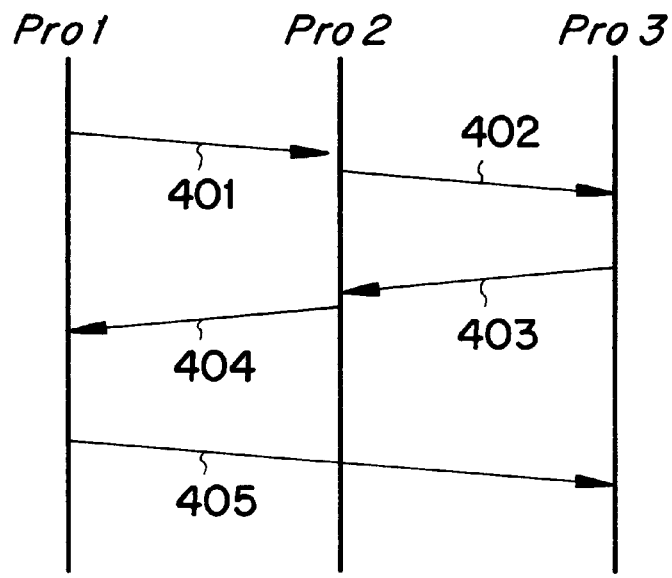
FIGS. 4a and 4b illustrate an efficiency improvement that is accomplished by means of the use of causal ordering in communications between processes.
Figure 4B:
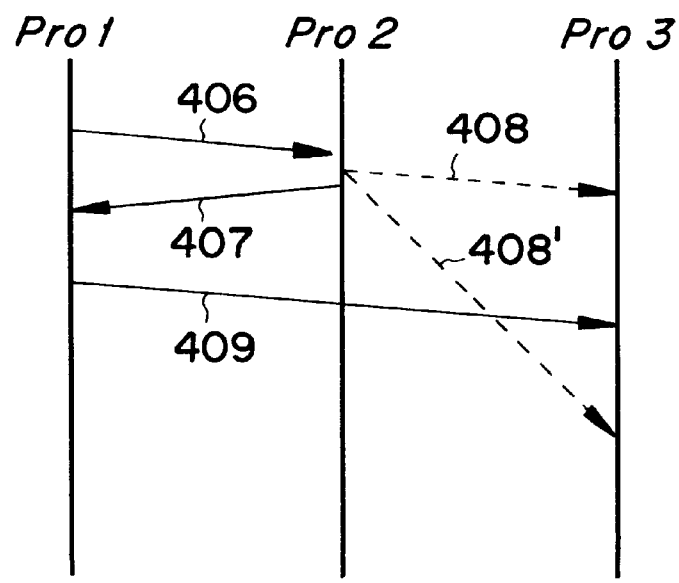

It will be recalled that one aspect of the invention is a requirement that requests from different clients, as well as fault and repair notifications, must be sorted in the same order, even though they may arrive in different orders in the primary and backup servers S 101 and S' 107. Thus, in some embodiments it may be beneficial to provide a mechanism for enforcing causal dependency (also referred to herein as "causal ordering") between messages. Essentially, this refers to the processing of messages in the order in which they had been logically issued, rather than in the strict order in which they may have been received. A more complete description of causal ordering may be found in connection with a description of the ISIS tool-kit, which was developed by Cornell University in Ithaca, New York, USA. The description may be found in K. P. Birman and R. van Renesse, "Reliable Distributed Computing with the ISIS toolkit,"

published 1994 by IEEE COMPUTER SOCIETY PRESS, ISBN 0-81865342-6. Causal ordering can be implemented with low overhead and can improve system efficiency by allowing a higher degree of concurrency. FIGS. 4a and 4b illustrate this efficiency improvement. In FIG. 4a, a processor Pro1 sends a request for a resource to a resource handler Pro2 (step 401). Without support for causal ordering in the underlying system, Pro2 must send a message to the resource Pro3 to initialize it (step 402). After the resource has replied that it is ready (step 403), Pro2 is now permitted to send a reply to Pro1, informing it that the resource is available (step 404). The processor Pro1 can now send a message to the resource Pro3 (step 405). It will be observed that the behavior of each processor is constrained by restrictions designed to prevent one processor from receiving (and consequently processing) a later-sent message prior to an earlier-sent message.

Referring now to FIG. 4b, this illustrates an example in which the underlying system supports causal ordering. Again, the example begins with the processor Pro1 sending a request for a resource to a resource handler Pro2 (step 406). Now, the resource handler Pro2 does not need to wait for a reply from Pro3. Instead, it immediately sends a reply to Pro1 informing that the resource is available (step 407). At approximately the same time, Pro2 sends a message to the resource Pro3 to initialize it (step 408). Because of this concurrence, the processor Pro1 is able to send its message to the resource Pro3 (step 409) much sooner than in the example without causal ordering (FIG. 4a). This does not create any problems because the causal message ordering guarantees that Pro3 will process the initialization message before receiving the message from Pro1, even if the message from Pro2 gets delayed (alternative step 408').

It is not necessary to implement a full causal ordering model for the limited case in which clients call a replicated server, because in such cases the sequence number is sufficient to enable the replicated server to process requests in the proper order. However, the full model is called for when the protocol is extended to a more general case, such as to allow a replicated server to call another replicated server.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A fault-tolerant client-server system, comprising:
a primary server;
a backup server; and
a client,
wherein:
the client comprises:
means for sending a request to the primary server;
means for receiving a response from the primary server,
wherein the response includes primary server state information;
means for sending the primary server state information to the backup server;
the primary server comprises:
means for receiving and processing the request;
means, responsive to the request, for sending the response to the client, independent of any backup processing, wherein the response includes the primary server state information;
means for performing backup processing that includes periodically sending the primary server state information to the backup server; and
the backup server comprises:
means for receiving the primary server state information from the primary server;
means for receiving the primary server state information from the client.

2. The fault-tolerant client-server system of claim 1, wherein the primary server state information includes all request-reply pairs that the primary server has handled since a most recent transmission of primary server state information from the primary server to the backup server.

3. The fault-tolerant client-server system of claim 1, wherein the primary server state information includes a checksum derived from a reply.

4. The fault-tolerant client-server system of claim 1, wherein the primary server's means for performing backup processing is activated periodically based on a predetermined time interval.

5. The fault-tolerant client-server system of claim 1, wherein:
the primary server further includes means for storing the primary server state information; and
the primary server's means for performing backup processing is activated in response to the means for storing the primary server state information being filled to a predetermined amount.

6. A method of operating a fault-tolerant client-server system that comprises a primary server, a backup server and a client, the method comprising the steps of:
sending a request from the client to the primary server;
in the primary server, receiving and processing the request, including sending a response to the client, independent of any backup processing being performed by the primary server, wherein the response includes primary server state information;
performing backup processing in the primary server, including periodically sending the primary server state information to the backup server;
in the client, receiving the response from the primary server; and
sending the primary server state information from the client to the backup processor.

7. The method of claim 6, wherein the primary server state information includes all request-reply pairs that the primary server has handled since a most recent transmission of primary server state information from the primary server to the backup server.

8. The method of claim 6, wherein the primary server state information includes a checksum derived from a reply.

9. The method of claim 6, wherein the step of performing backup processing in the primary server is performed periodically based on a predetermined time interval.

10. The method of claim 6, wherein:
the primary server further performs the step of storing the primary server state information in storage means; and
the step of performing backup processing in the primary server is performed in response to the storage means being filled to a predetermined amount.

* * * * *